US008214183B2

(12) United States Patent
Stephane (10) Patent No.: US 8,214,183 B2
(45) Date of Patent: Jul. 3, 2012

(54) PROCESS AND SYSTEM OF MODELING OF AN INTERFACE BETWEEN A USER AND HIS ENVIRONMENT ABOARD A VEHICLE

(75) Inventor: Alexandre-Lucas Stephane, Toulouse (FR)

(73) Assignee: Airbus, Blagnac (FR)

( * ) Notice: Subject to any disclaimer, the term of this patent is extended or adjusted under 35 U.S.C. 154(b) by 877 days.

(21) Appl. No.: 11/492,023

(22) Filed: Jul. 25, 2006

(65) Prior Publication Data

US 2007/0156295 A1    Jul. 5, 2007

Related U.S. Application Data

(60) Provisional application No. 60/714,828, filed on Sep. 8, 2005.

(30) Foreign Application Priority Data

Jul. 25, 2005  (FR) ...................................... 05 07894

(51) Int. Cl.
*G06G 7/48* (2006.01)
(52) U.S. Cl. .......................................................... 703/6
(58) Field of Classification Search .................. 703/1, 6; 706/14–44
See application file for complete search history.

(56) References Cited

U.S. PATENT DOCUMENTS

| 6,096,086 | A | * | 8/2000 | Weber et al. | ........................ | 703/8 |
| 6,113,643 | A | * | 9/2000 | Weber et al. | ........................ | 703/8 |
| 7,039,571 | B1 | * | 5/2006 | Munger et al. | .................. | 703/13 |
| 2003/0018454 | A1 | * | 1/2003 | Winkler et al. | .................... | 703/1 |
| 2006/0253792 | A1 | * | 11/2006 | Grace et al. | ..................... | 715/771 |
| 2009/0021490 | A1 | * | 1/2009 | Stickels | ........................ | 345/173 |

OTHER PUBLICATIONS

Rong et al, "Cockpit System Design for General Aviation Free Flight Using a Cognitive Engineering Approach", Aug. 2003, AIAA, pp. 1-10.*
Miwa Hayashi, et al., "Hidden Markov Models to Identify Pilot Instrument Scanning and Attention Patterns", Institute of Electrical and Electronics Engineers, vol. 5 of 5, XP-010668058, Oct. 5, 2003, pp. 2889-2896.
Database Compendex, AN E2001095484018, XP-002376234, Oct. 1999, 1 page.
Joseph H. et al., "Computer interface evaluation using eye movements: methods and constructs", International Journal of Industrial Ergonomics, vol. 24, No. 6, XP-002376232, Oct. 1999, pp. 631-645.

(Continued)

*Primary Examiner* — Hugh Jones
(74) *Attorney, Agent, or Firm* — Oblon, Spivak, McClelland, Maier & Neustadt, L.L.P.

(57) ABSTRACT

A method for determining a model of an interface between a user and the users environment on board a vehicle, the method including, constructing an interface model based on a first type of information representative of interface elements of the vehicle, and a second type of information representative of the knowledge that a user has concerning the use of the interface elements of the vehicle; acquiring data representative of at least one human activity which occurs during the interaction between the user and the interface elements, the acquiring of the representative data is achieved by at least one data-acquisition apparatus; analyzing the data that is acquired; and adjusting the interface model as a function of the data that was analyzed.

19 Claims, 7 Drawing Sheets

OTHER PUBLICATIONS

Zoran Duric, et al., "Integrating Perceptual and Cognitive Modeling for Adaptive and Intelligent Human-Computer Interaction", Proceedings of the IEEE, vol. 90, No. 7, XP-011065033, Jul. 2002, pp. 1272-1289.

A. R. Pritchett, et al., "Examining Air transporation safety Issues through agent-based simulation incorporating human performance models", 21th. DASC, vol. 1 of 2, XP-010616182, Oct. 27, 2002, pp. 46-58.

Asaf Degani, et al., "Modes in Human-automation interaction: Initial Observations about a Modeling Approach", Systems Man and Cybernetics, vol. 4, XP-010194829, Oct. 22, 1995, pp. 3443-3450.

* cited by examiner

| T13 | CLIMB | | | | | |
|---|---|---|---|---|---|---|
| | PF | | | PF | | |
| Action | Info/mode | I.I. Utilised | Action | Info/mode | I.I. Utilized | |
| | | | Land LT | OFF | (CP) | |
| MCDU | PERF CLB | MCDU(CP) | MCDU | F-PLN | MCDU(CP) | |
| FSU/FMGS | SET if AP on | (GS) | FSU/FMGS | SET if AP off | (GS) | |
| When cleared to FL | | | At transition altitude | | | |
| BARO ref | SET X Check | FCU(GS) PFD(IP) | BARO ref | SET X Check | FCU(GS) PFD(IP) | |
| After to/climb C/L Below the line | | ECAM(CP) | | | | |
| During climb | | | | | | |
| 1000' (CAPT) | LAND LST OFF | PFD(IP) | | | | |
| Radio Nav | Chek | ND(IP) +EFIS(GS) | | | | |
| Radar TILT | ADJUST | RADAR (CP)+ND(IP) | | | | |
| Sec F-PLN | As rqrt | MCDU(CP) | Opt / Max Alt | Chek | PFD | |

| No. | Zone name | Responsibilities of the zones |
|---|---|---|
| Z1 | FMA | FMA indicator:<br>- Information on Auto Pilot mode, FD, A/THR<br>- Radionavigation information |
| Z2 | VA | - Value of airspeed + tendency (rolling scale)<br>- Indication of VA limit<br>- Indication of selected VA + particular Va |
| Z3 | AA | - Airplane attitude indicator<br>  pitch, trim, roll (artificial horizon)<br>  yaw, sideslip (pyramid)<br>- Guidance information<br>- Control column information |
| Z4 | A/Vv | - Altimeter indicator + tendency<br>- Vertical speed indicator<br>- Selected limits and values |
| Z5 | ILS-GS | - ILS position, glide slope<br>- Glide deviation |
| Z6 | ILS-Loc | - ILS horizontal deviation, localizer<br>- Localizer deviation |
| Z7 | M/I | - Mach indicator<br>- ILS information |
| Z8 | H/T | - Indicator of guidance toward selected point<br>- Aircraft heading indicator |
| Z9 | Ref/Alt | - Altimetric reference indicator |

Fig. 6

| No. | Name of agent | Responsibilities of agent | Breakdown into cognitive resources | PFD zones | Tasks |
|---|---|---|---|---|---|
| A1 | Vertical motion analyzer (altitude, V/S) | 1. values of vertical parameters | 1 - Values of parameters (altitude, V/S) | Z4 | T11 |
|  |  |  | 2 - Values of selected parameters (altitude, V/S) FMGS information | Z4 | T12 |
|  |  |  | 3 - Limit values of altitude protection, V/S | Z4 | T11 |
|  |  | 2. symbology of vertical parameters | 4 - Reference value of altitude | Z4 | T31 |
|  |  |  | 1 - Symbols for altitude and vertical speed | Z9 | T11 |
|  |  |  | 2 - Fixed and rolling scale | Z4 | T12, T22, T31 |
| A2 | Horizontal motion analyzer (speed and heading) | 1. values of horizontal parameters | 1 - Value of airspeed parameter | Z2 | T11 |
|  |  |  | 2 - Value of mach parameter | Z6 | T11 |
|  |  |  | 3 - Value of selected speed | Z2 | T12 |
|  |  |  | 4 - Limit values of speed protection | Z2 | T31 |
|  |  | 2. symbology of horizontal parameters | 1 - Rolling scale for heading | Z8 | T11 |
|  |  |  | 2 - Rolling scale for speed | Z2 | T11 |
|  |  |  | 3 - Symbols for heading | Z8 | T12 |
|  |  |  | 4 - Symbols for speed | Z2 | T12, T31 |
| A3 | Attitude analyzer A/C | 1. values of attitude parameters A/C | 1 - Trim, roll, pitch, yaw, sideslip parameters | Z3 | T11 |
|  |  |  |  | Z3 | T31 |
|  |  | 2. symbology of attitude A/C | 1 - Signaling of attitude protection | Z3 | T13 |
|  |  |  | 2 - Symbol for A/C / artificial horizon (mobile motion tendency) | Z3 | T13 |
| A4 | FMGS instruction tracker | 1. local guidance A/C for tracking flight instructions | 1 - Tracking (altitude, V/S) | Z5, Z4 | T22 |
|  |  |  | 2 - Tracking (speed, Mach) | Z2 | T22 |
|  |  | 2. global guidance A/C for tracking flight instructions (managed or selected) | 3 - Tracking (heading, track) | Z8 | T22 |
|  |  |  | 1 - Control column sight (FD cross and FPA/FPD) | Z3 | T22 |
| A5 | Orientation/ ILS | 1. tracking ILS guidance | 1 - Information on ILS frequency | Z7 | T21 |
|  |  |  | 2 - ILS/GS position | Z5, Z6 | T21 |
|  |  |  | 3 - Tracking of ILS axis | Z5, Z6, Z8 |  |
| A6 | FMA | 1. Information originating from the FMGS, permitting creation of the mental model of the guidance and flying status | 1 - Information on auto-thrust operations (A/THR) | Z1 | T21 |
|  |  |  | 2 - Longitudinal modes of the AP/FD |  |  |
|  |  |  | 3 - Lateral modes of the AP/FD |  |  |
|  |  |  | 4 - Approach options |  |  |
|  |  |  | 5 - Engagement statuses of the AP, FD, A/THR |  |  |
| A7 | Color code |  | 1 - Indicate mode of engagement rules and statuses | Z3, Z1 | T22 |
|  |  |  | 2 - Indicate if values or selected or actual | Z2, Z4, Z8 | T12 |
|  |  |  | 3 - altitude alert (yellow and amber) | Z7, Z2, Z4 | T32 |
|  |  |  | 4 - Indicate the protections (red) | Z2, Z6, Z4 | T31 |
|  |  |  | 5 - Group all of the information used for the same task. |  | T1, T2, T3 |
| A8 | Alert | 1. Stabilization of the altitude selected by FCU | 1. Sound alert | FWC | T3 |

Fig. 7

| | TECHNICAL SYSTEM | | | HUMAN | | |
|---|---|---|---|---|---|---|
| Plan | Linking Agent | Agent | Resources | Resources | Agent | Linking agent | Plan |
| CLIMB | EFIS : A3 | PFD : A1 | PFD : Z4,Z9 | Inputs – Outputs:<br>Visual:<br>- PFD altitude monitoring<br>Processing:<br>- WM, LTM<br>- Decision making | PFD agent | Flight plan Tracking | -Use of PFD<br>-Airplane control |

Fig.8

PROCESS AND SYSTEM OF MODELING OF AN INTERFACE BETWEEN A USER AND HIS ENVIRONMENT ABOARD A VEHICLE

The invention relates to a method and a system for determining a model of an interface between an operator and his environment on board a vehicle.

In different sectors (aeronautics, automobile, maritime, etc.), the air, terrestrial or maritime vehicles necessitate, for use thereof (control or operation, navigation, communication, environmental monitoring, system management, etc.), instrument panels endowed with a plurality of interface elements.

To complete his task properly, the user of the vehicle under consideration controls interface elements and must fully understand the functions performed by these interface elements, the information that they deliver and the procedures describing sequences of actions (manual, visual, auditory) to be accomplished in relation with the interface elements.

Thus it is understood that, during control of a vehicle, the interaction between the user and the interface elements disposed on board the vehicle has great importance and is therefore the subject of much attention.

It therefore would be interesting to be able to evaluate this interaction in novel and efficient manner, in order, for example, to be capable of improving existing interface elements, of designing new such elements or of improving flight procedures, or else of improving the arrangement of a plurality of interface elements relative to one another.

To this end, the present invention has as its object a method for determining a model of an interface between a user and his environment on board a vehicle, characterized in that it includes the following steps:

construction of an interface model on the basis, on the one hand, of a first type of information representative of interface elements of the vehicle and, on the other hand, of a second type of information representative of the knowledge that a user has concerning the use of interface elements.

acquisition of data representative of at least one human activity which is sought during the interaction between the user and these interface elements, the acquisition of these data being achieved by means of at least one data-acquisition apparatus, analysis of the data thus acquired, adjustment of the interface model as a function of the data analysis.

The interface model is constructed on the basis of the duality of the user and technical system and not merely of the technical information representative of the system, which makes it possible to obtain a very reliable model founded on a set of information internally structured in such a way that it is particularly representative of the interaction between the user and his environment on board the vehicle, and especially the interface elements thereof.

By virtue of recorded data that reflect the visual and/or gestural and/or vocal and/or physiological behavior of the user in relation to the interface elements and to the interpretation of these data, it is possible to enrich the previously constructed interface model and therefore to adapt it as closely as possible to the context that it is supposed to represent.

As an example, it is possible to detect anomalies of functioning in the interface elements, to evaluate new interface elements, to determine that an interface element should deliver certain information or ensure certain functions, or else to determine that a new interface element performing one or more given functions would be particularly useful.

According to one characteristic, the two types of information, the first type of information of technical origin and the second type of information of human origin, are furnished with an identical configuration to a dynamic database having a symmetric structure with respect to the user and the technical system.

To the extent that the information of both types is always furnished in the same unique format, a gain in time and efficiency is achieved in the processing of such information and therefore in construction of the model.

According to one characteristic, both types of information are configured according to the same multi-agent cognitive model.

Such a representation of the information proves to be particularly suitable and efficient for construction of the interaction model.

According to one characteristic, the configuration of information of the first type according to a multi-agent cognitive model comprises a step of establishment of a link between procedures for use of the vehicle and the interface elements of the vehicle.

In this way there is established a correspondence between the different steps of the procedures for use of the vehicle (such as control) and the interface elements involved in each step in order to model such elements.

According to one characteristic, the configuration of information of the first type according to a multi-agent cognitive model comprises a step of identification of functional zones on each interface element under consideration.

By defining such zones within one and the same interface element, it will be possible to obtain a detailed model of each interface element and therefore to obtain thereafter, during the data-acquisition step, detailed information on the interaction between the user (such as the pilot) and the zones or even several zones of different interface elements.

In this way the model will be even more complete and thus more reliable by acquiring, for example, oculometric data relating to these zones of one and the same interface element or of several such elements.

According to one characteristic, the configuration of information of the first type according to a multi-agent cognitive model comprises the following steps for each interface element:

determination of tasks relating to the use of the vehicle and performed by the interface element under consideration, determination of agents of the multi-agent cognitive model relative to the determined tasks, establishment of a link between the thus determined agents of the cognitive model and the identified functional zones of the interface element under consideration.

The model established in this way is particularly representative of the interaction of the user (such as a pilot) with the interface element under consideration, taking into account tasks assigned to the interface element and that are determined, for example, by procedures for use of the vehicle (such as control).

According to one characteristic, the human activity sought during the interaction between the user and the interface elements is selected among vision, speech, hearing, motor function, and physiological manifestations and reactions of the human body.

The acquisition and analysis of data reflecting very diverse human activities furnish very useful information, with which, for example, the interaction model can be supplemented/modified.

According to one characteristic, the data-acquisition apparatus is an oculometric apparatus recording visual data representative of the eye movements of the user over the interface elements.

Such an apparatus is particularly useful for describing the visual behavior of the user (such as a pilot) when his gaze moves over different interface elements as well as the exterior visual scene, or even particular zones within one or more interface elements.

This apparatus may be coupled with another apparatus making it possible to record, in video form, for example, the gestures of the pilot, while the position of his gaze is tracked by the first apparatus. Audio recordings may also be very useful. In this way there is obtained a greater number of data to be processed and a greater variety of data, thus making it possible to enrich the interface model and to make it even more faithful to the context that it is supposed to represent.

The interface model determined as briefly described hereinabove finds applications in numerous areas (aeronautics, space, automobile, maritime, etc.) and can be used in numerous applications:
  improvement of one or more interface elements;
  design of one or more interface elements;
  evaluation of one or more interface elements;
  modification of a procedure for use (such as control) of the vehicle;
  training of users (such as pilots) in the control of the vehicle.

The invention also has as its object a system for determining a model of an interface between a user and his environment on board a vehicle, characterized in that it includes:
  means for construction of an interface model on the basis, on the one hand, of a first type of information representative of interface elements of the vehicle and, on the other hand, of a second type of information representative of the knowledge that a user has concerning the use of interface elements.
  at least one apparatus for acquisition of data representative of at least one human activity which is sought during the interaction between the user and these interface elements,
  means for analysis of the data thus acquired,
  means for adjustment of the interface model as a function of the data analysis.

This system has the same aspects and advantages as those presented hereinabove with regard to the method, and they therefore will not be repeated here.

Other characteristics and advantages will become apparent in the course of the description hereinafter, given solely by way of non-limitative example and referring to the attached drawings, wherein:

FIG. 7 represents, in table form, the link between the agents of the cognitive model and the functional zones of the on-board instrument illustrated in FIG. 5;

FIG. 8 illustrates an example of construction of tables 16 and 18 of FIG. 1a.

The invention finds a particularly advantageous application in aeronautics, especially in the modeling of interface elements of an airplane cockpit.

Several types of instrument panel are found in an airplane cockpit, for example the principal instrument panel IP (or "main instrument panel" in English), on which there are disposed several on-board instruments acting as interface elements for the pilot known as PF ("Pilot Flying" in English) and the copilot known as PNF ("Pilot Non Flying" in English), specifically, for example, the instrument known as PFD ("Primary Flight Display" in English) and the instrument known as ND ("Navigation Display" in English). There are also found a central panel CP ("central panel" in English), an upper panel OP ("overhead panel" in English) and a panel below the windshield GS ("glareshield panel" in English).

The cockpit user, or in other words the pilot, uses all the interface elements of the aforesaid instrument panels to carry out control of the airplane, navigation tasks and protective tasks to keep the airplane flying.

In order to facilitate execution of these tasks by the pilot and to permit him to perform his activity with maximum safety, it has proved useful to determine an interface model between the pilot and his environment on board the airplane.

Figure 1A:
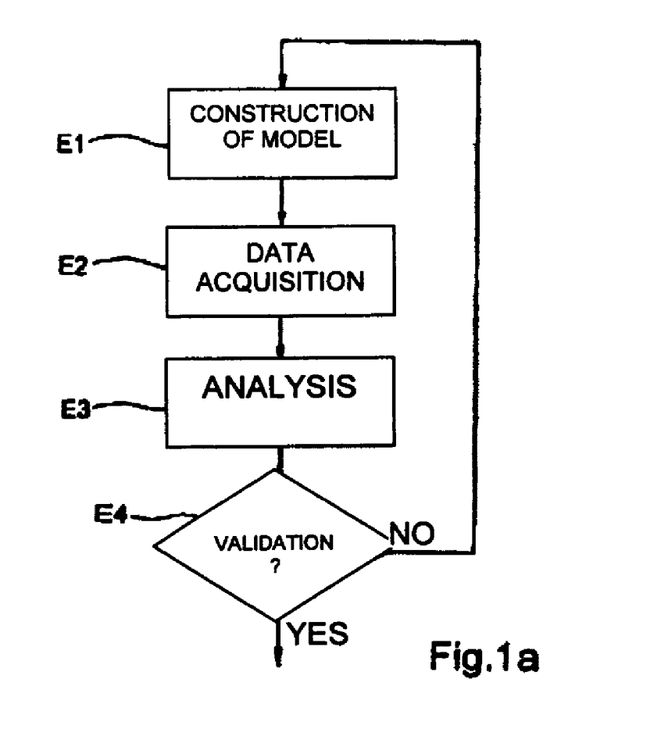
FIG. 1a generally represents an algorithm of the method of determining an interface model according to the invention.

The algorithm of FIG. 1a illustrates the principal steps of the method according to the invention for determining such a pilot-cockpit interface model.

This algorithm is executed by a computer functioning in cooperation with data/information storage means (databases, memories, etc.).

In the course of a first step E1, it is provided that an interface model of the cockpit will be constructed on the basis of two types of information, a first type of information relating to the technical system and more particularly representative of interface elements of the cockpit, and a second type of information relating to the human and more particularly representative of the knowledge that a pilot has concerning the use of interface elements of the cockpit and the flight procedures, as well as of his behaviors (experience of the airplane pilot).

The pilot-cockpit interaction is based on interfaces having dynamic character, including the behaviors of the user and of the technical system.

This step is based on the use of information of both technical origin and human origin in order to take into account the user-technical system pair during construction of the interaction model.

Figure 2:
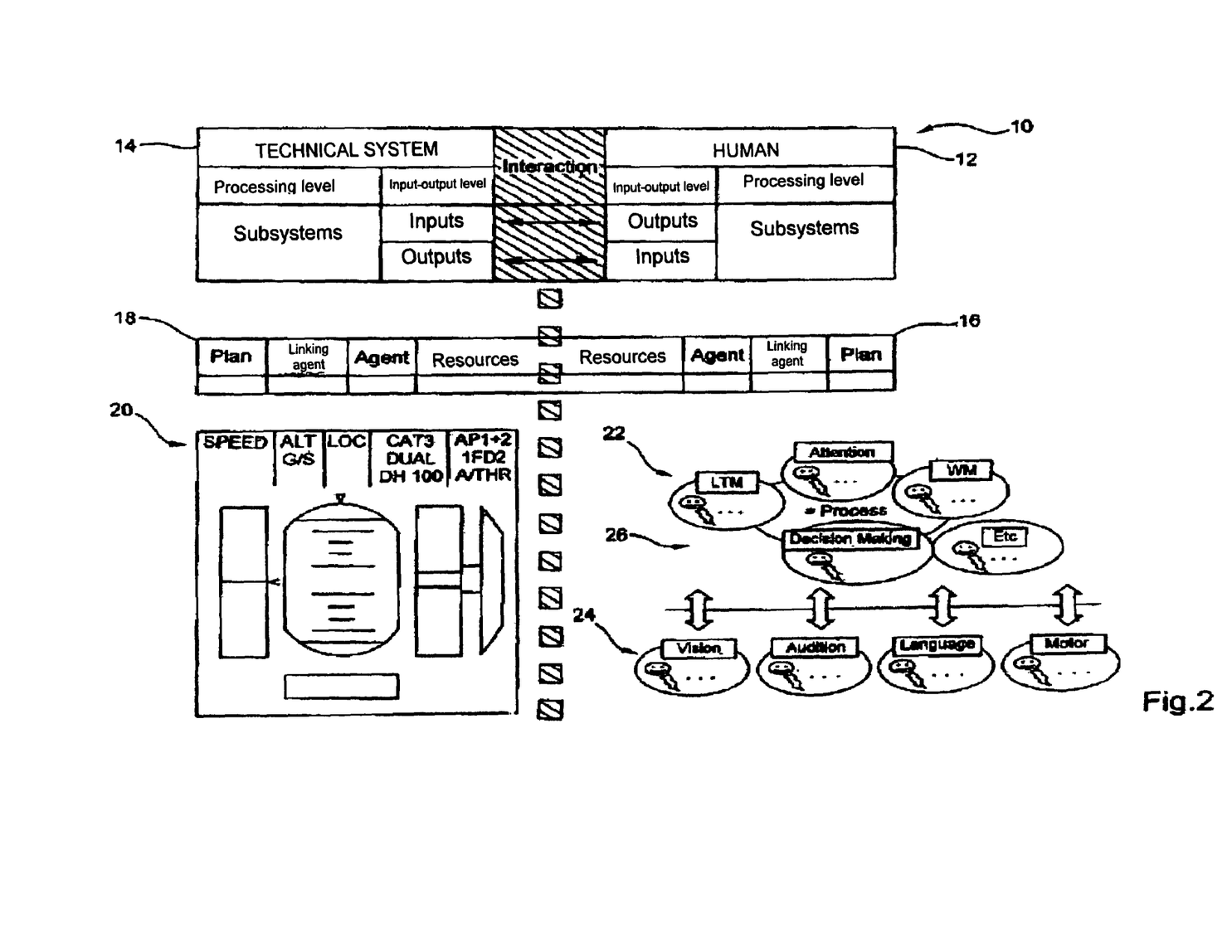
FIG. 2 schematically represents the process of construction of the interface model according to the invention.

As illustrated in FIG. 2, the aforesaid two types of information are furnished to a dynamic database 10 endowed with a pilot (human)-technical system structure, symmetric relative to the interaction axis separating the base part 12 relating to the human aspect and the base part 14 relating to the technical aspect.

It will be noted that the information is deposited in this database in a manner structured according to an identical configuration which is defined, according to each aspect (human and technical), by an input-output level detailing all the inputs and outputs used and by a processing level detailing the different subsystems used.

The model is constructed beginning with identification of the inputs and outputs of the human side and of the technical side, after which subsystems are identified at the information processing level.

The symmetric construction of the model of interaction between the human-technical system makes it possible to apply the same methods to all entities present. Since the technical system as well as the human are envisioned as complex systems and are broken down analogously into subsystems (in other words, if vocal alarms (belonging to the vocal subsystem) and graphic alarms (belonging to the graphic subsystem) on the technical system side are considered), it is necessary to consider the subsystems by means of which the human will perceive, be aware and process these alarms: on the human side these subsystems are assimilated with auditory and visual modes, with attention, with the system for processing symbols, with short and long term memory and with decision making.

The information of technical origin (first type) and of human origin (second type) are configured in identical manner according to the same multi-agent cognitive model, and the known UML language ("Unified Modeling Language" in English) is used to formalize the pilot-cockpit pair.

In the multi-agent cognitive model, there will be defined agents making it possible to describe the knowledge processes of the pilot in relation to the interface elements of the cockpit.

This multi-agent representation is particularly suitable for describing processes that can evolve simultaneously.

In fact, a pilot may have to analyze visual information (at the input to the human side and at the output from the technical system side) at the same time as auditory information, such as sound alarms.

This multi-agent representation is also particularly suitable for the case of tracking information that follows a sequential path and that can arise between different independent interface elements.

Furthermore, this representation is also useful for establishing an appropriate hierarchy and classification of information for the purpose of facilitating later analysis of data representative of human activities involved in the interaction between the pilot and interface elements.

In cognitive modeling based on agents and resources, the agents of the cognitive model are determined by their roles, their responsibilities, their resources or functions and the objectives to be attained.

According to this multi-agent approach, the area of application or in other words the use of interface elements of the airplane cockpit is analyzed in terms of needs to be satisfied in a given context.

The agents are oriented by one objective, and they make it possible to take into account what is wished relative to the constitutive scheme of the pilot's thought processes.

For example, the pilot believes that, to change flying level, he needs a certain number of conditions in order to assure that his maneuver will be successful: visibility, status of the engines, atmospheric conditions . . . .

The pilot therefore wishes to obtain such information in order to be able to accomplish his task, and he will therefore use the cognitive resources furnished to him by the interface elements (on-board instruments).

In this way he supplements his awareness of the situation and can visualize the future and act accordingly.

All of these aspects therefore will be amenable to being evaluated in an experimental framework based on multi-agent cognitive modeling.

These agents that contribute to cognitive processes involve perception, comprehension and mental representation of the interface elements of the cockpit.

Thus each agent satisfies the objectives established by means of action plans, which in aeronautics, for example, are procedures defining the use of on-board instruments in the crew operating manual known as FCOM ("Flight Crew Operating Manual" in English) which provides in particular for review of different checklists, of landing and takeoff phases, etc.

On the user's (pilot's) side, these action plans correspond to the mental representation that the user has of written flight procedures. This representation varies as a function of experience.

As already mentioned hereinabove with reference to FIG. 2, the cognitive architecture is based on two principal levels, or in other words the input-output level and the information processing level.

Agents are classified by level (input-output or processing) and by type (input-output channel or processing system).

Thus several types are encountered on the same level: agents of the visual type, agents of the auditory type, etc. are available at the input-output level, and attentional agents, mnemonic agents, decision-making agents, etc. are available at the processing level.

As indicated hereinabove, the agents are characterized by one or more roles, responsibilities and resources.

More particularly, the role of an agent is defined relative to a task or sub-task (for example, relative to control of the vehicle) that must be performed.

The responsibilities of the agent are to execute the task or sub-task, and the resources used permit effective execution of the task or sub-task.

Thus, for example, a three-dimensional scene can be represented by a set of agents, each of which is in charge of a particular characteristic of the scene, such as relief or textures. The textures correspond to the grid density of the relief, which can be variable or constant depending on the terrain database, that is, the grid elements can have the same size everywhere or that the grid elements can have different sizes depending on the relief zones represented, the colors and the symbology.

As for all agents, the resources of these agents are classified by level (input-output or processing) and by type (input-output channels or processing system).

Thus, for example, the relief of the aforesaid three-dimensional visual scene that can be represented by one agent may draw on varied resources used for detecting and analyzing the valleys, rivers, woods, roads, building structures, etc. of the visual scene.

The determination of the agents of the multi-agent cognitive model is performed according to the steps of the method indicated hereinafter, which steps are carried out iteratively by means of two approaches, the approach going from the top to the bottom, known as "top down", and the approach from the bottom to the top, known as "bottom up."

The "top down" approach is based on facts that may be known about the pilots as well as on the manner in which they use the interface elements of the cockpit, and it can facilitate the classification into agents.

The "bottom up" approach is based on the interface elements of the cockpit and the visual indications, which are grouped in order to reveal responsibilities and agents.

The modeling of the cockpit according to this multi-agent cognitive model makes it possible to define the elements of the visual scene at a fine level of granularity, which takes into consideration constitutive elements of each interface element (on-board instruments), or in other words information zones of these interface elements, and not each interface element as a set (coarse level of granularity).

Within the scope of this model, the resources of agents defined in this way are assigned to the processing of interface elements.

In general, the formalization of the pilot-cockpit pair is not confined to representing disparate entities, but proposes to define links between these entities, as represented in FIG. 2, by organizing the entities in the form of tables 16, 18 containing resources, agents, linking agents and plans, both on the human side and on the technical system side. It will be noted that the linking agents make it possible to define direct links to specific resources of another agent. Without these linking agents, it would be possible to link only agents and not resources to agents.

As illustrated in FIG. 2, the modeling of the technical system is represented on the left of FIG. 2 by the modeling of PFD interface element 20, which will be detailed hereinafter, while on the right side of this same figure there is represented the architecture of the cognitive modeling of human side 22 on the two main levels, or in other words input-output level 24 and level 26, where information processing takes place.

Each of these levels can be broken down into several subsystems, such as that of vision, audition, language and motor function for the first and that of attention, in English "long term memory" (LTM), "work memory" (WM) and "decision making", for the second.

As soon as the interface model has been constructed on the basis of the two types of information (information representative of interface elements and information representative of human knowledge and behavior with regard to the use of interface elements), the algorithm of FIG. 1a provides a data acquisition step E2.

In the course of this step, there are acquired data representative of one or more human activities (such as vision, speech, audition, movement of human limbs, kinesthesia, physiological manifestations and reactions of the human body, etc.) that are involved in the pilot's interaction with the interface elements.

Thus, for example, at a given instant, the pilot not only gazes at a zone of an interface element of the cockpit, the item or items of information being detected by an oculometric apparatus and automatically integrated into a results database, but also acts simultaneously on the control column and/or on other devices, the corresponding item or items of information being collected by a video or other recording system and also being stored.

It will be noted that, depending on the nature of the human activity in question, there is used a suitable data acquisition apparatus (oculometer, video recorder, electrodermal sensor, etc.).

After these data have been acquired, they are studied in the course of the following step (step E3), for example by the expert pilot or pilots who have undergone the test aimed at in step E2.

In the course of analysis of the acquired data, the test subject examines the results and proceeds to interpret them by trying to determine whether an action he took at a given instant of the test was quite appropriate and whether it took place at the right time.

More generally, he explains the relationship between gathering of information/absence of gathering of information and action/absence of action.

In the course of interpreting these results, the subject of the test determines, for example, why his gaze followed a given eye movement over one or more consecutive interface elements and/or over one or more zones of the same interface element.

Depending on the results of this analysis and on the interpretation thereof by the subject of the test, and if appropriate by other experts of different disciplines, it is possible to validate the modeling framework for the pilot-cockpit interface just as it was constructed or to adjust it.

Thus, for example, it may be found that an interface element is lacking that would permit the pilot to complete his control, navigation or other task successfully, or else that a navigation interface element (display, etc.) is lacking.

It may also be found that the granularity level adopted during construction of the interface model is too fine and therefore little representative of the real context, or on the other hand that the granularity level is too coarse and therefore does not permit sufficient pertinent information representative of this context to be obtained.

The interpretation of the test results also makes it possible to reveal dysfunctioning of interface elements or of flight procedures.

As an example, this may be observed after considerable fatigue and elevated stress of the test subject has been recorded. It is therefore possible to improve the interaction model as a function of the results of step E3.

In this way an iterative procedure is followed by repeating the loop represented in FIG. 1a between step E4 and step E1 until there is obtained the desired interaction model that is as representative as possible of the environment on board the airplane.

As soon as the interface model has been determined by the method according to the invention in conformity with the set objectives, then this validated model can be used, for example, for training future pilots in a flight simulator or else for improving interfaces proposed by the system (layout, sequencing of information, spatial and multi-modal redundancy, etc.).

Figure 1B:
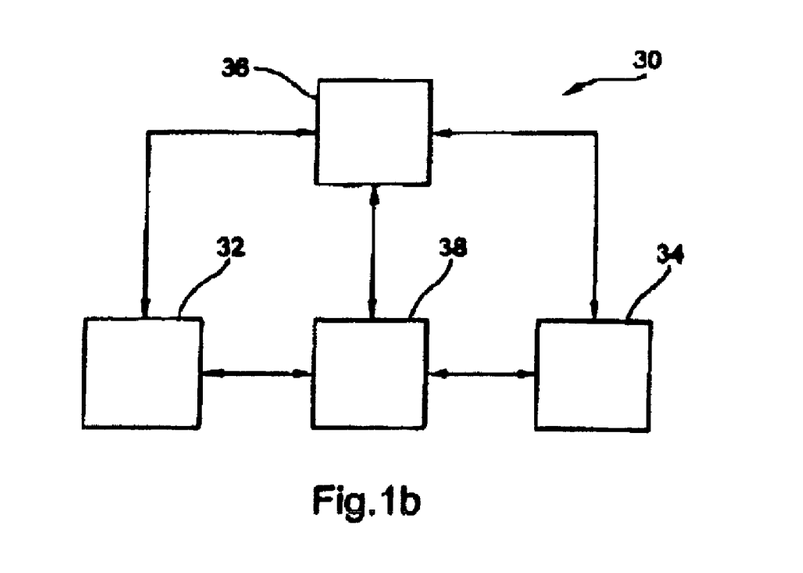
FIG. 1b schematically represents a system for use of the method according to the invention.

It will be noted that FIG. 1b represents a system 30 for determining a model according to the invention, representative of the interaction between user 32 and interface elements 34. This system comprises a computer 36 having inputs and outputs for cooperation with user 32 and interface elements 34, as well as with a data acquisition apparatus 38 (such as an oculometric apparatus), which transmits the acquired data that are to be analyzed to computer 36.

Figure 3:
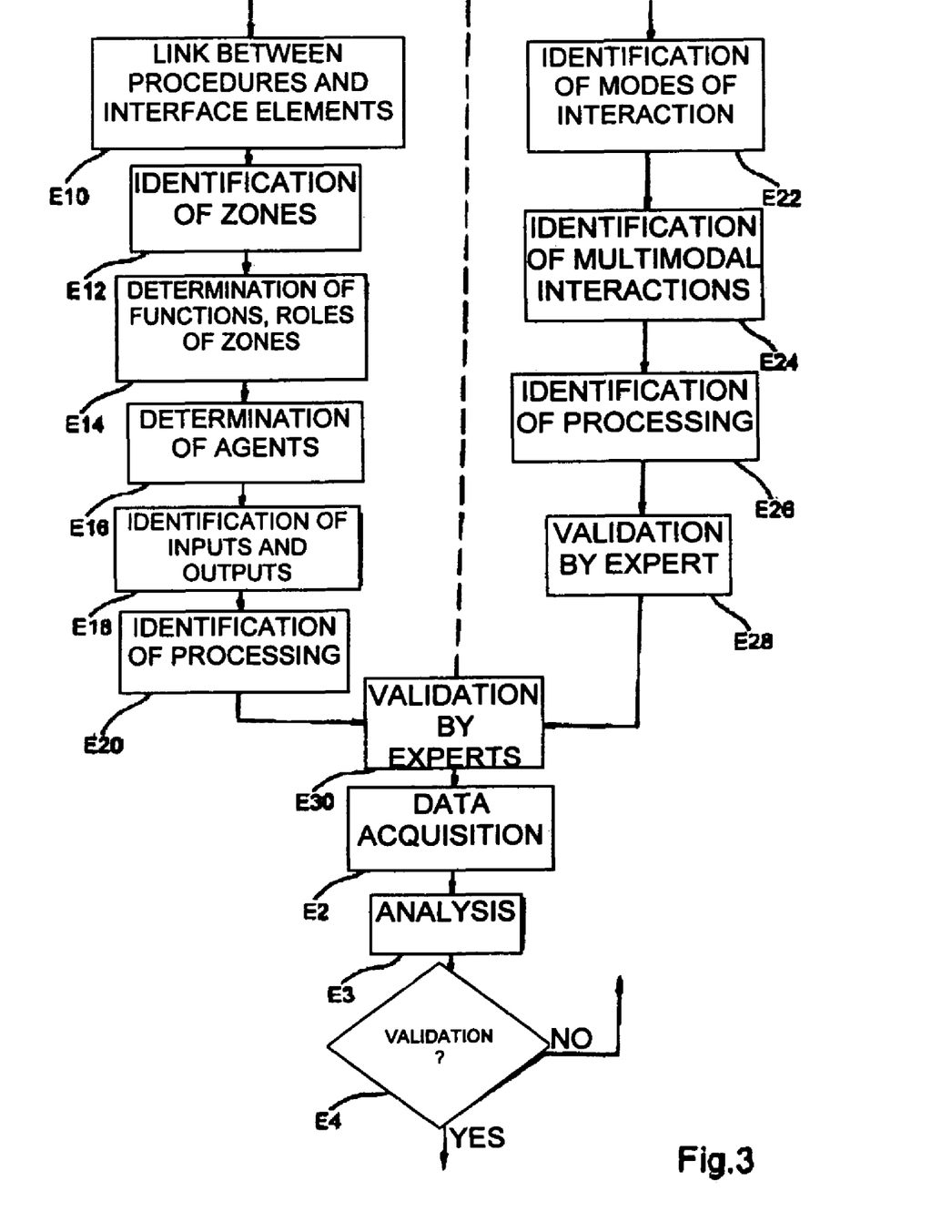
FIG. 3 schematically represents an algorithm detailing the steps illustrated in the algorithm of FIG. 1a FIG. 4 is a table illustrating the correspondence between a flight procedure and the on-board instruments used in each step of the procedure.

The algorithm of FIG. 3 illustrates in more detail the steps of the algorithm of FIG. 2 by showing the symmetric formalization of the pilot-cockpit pair.

Construction of the interface model of the technical system side begins with a first step E10, in the course of which there is established a link between the flight procedures defined in the FCOM manual and the interface elements of the cockpit (on-board instruments such as PFD, ND, etc.) that the pilot (PF) and copilot (PNF) must consult for each action described in the flight procedure in question.

Among these procedures, there are found in English the "takeoff" procedure, the post-takeoff procedure, in English the "climb" procedure, the "cruise" procedure, the "descent preparation" procedure, the "descent" procedure the "standard approach" procedure, the "non-precision approach" procedure and the "landing" procedure.

Figure 4:
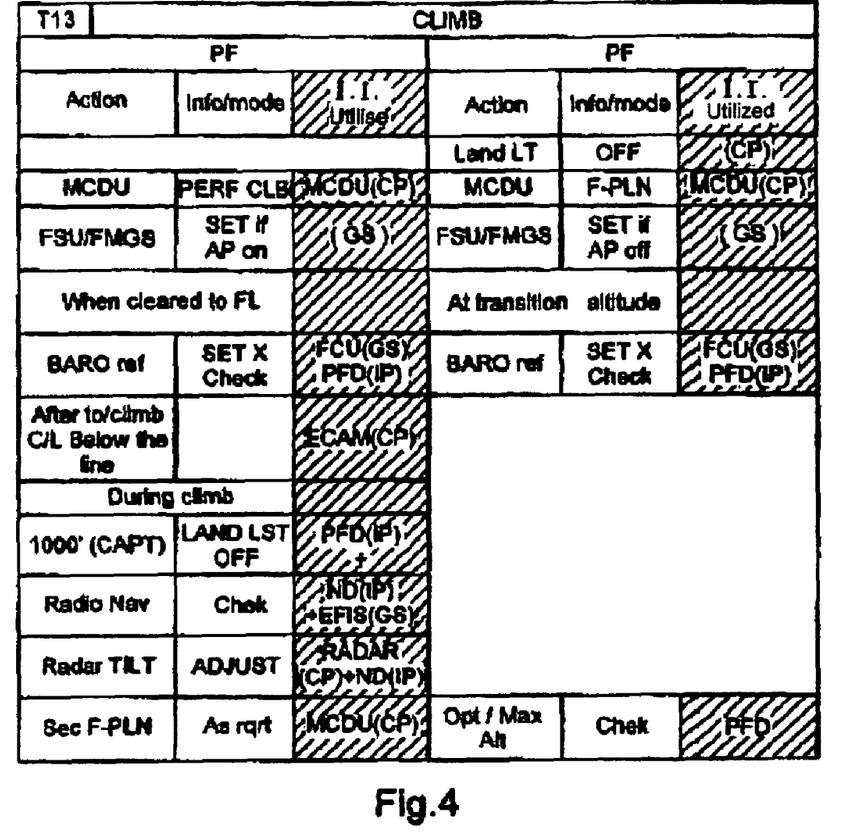

By associating the on-board instruments involved in each action described in the "climb" flight procedure of the control manual of an Airbus A340, there is obtained the table illustrated in FIG. 4. showing, for example, that the pilot must consult the instrument known as FCU ("Flight Control Unit" in English) of the GS panel in SET-value mode and the PFD instrument of the main panel IP in CHECK mode in order to read the BARO indication (barometric reference).

Similarly, while climbing, the pilot must consult the PFD instrument of the main panel to see the speed and altitude information as well as the airplane's altitude.

As soon as the flight procedures have been linked to the cockpit interface elements in question, the algorithm of FIG. 3 provides a subsequent step E12, in the course of which information zones of each interface element of the cockpit are identified and functions performed by these zones are determined.

Figure 5:
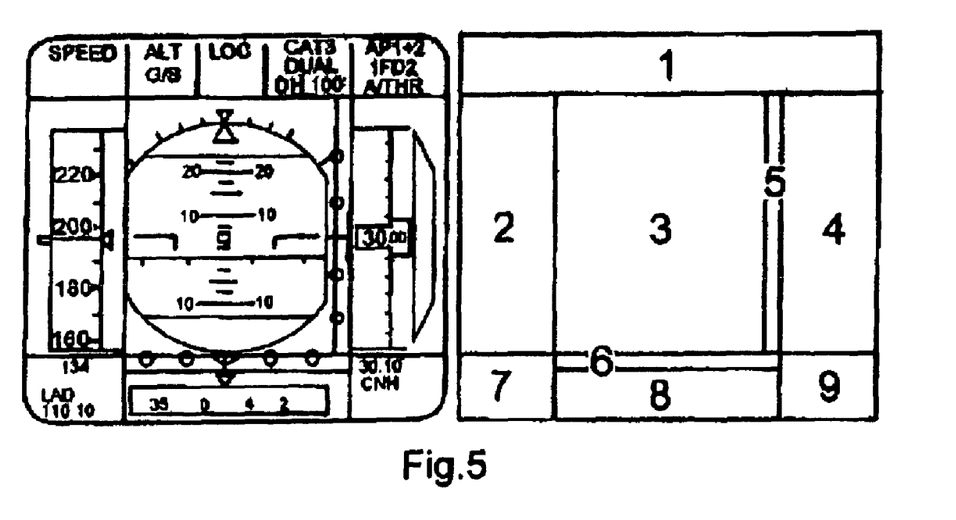
FIG. 5 illustrates the identification of different information zones on an on-board instrument.

As an example, the different information zones on the interface element known in English as the PFD ("Primary Flight Display") are identified with reference to FIG. 5.

This figure is divided into two parts: the PFD interface element is represented in the left part and the different information zones of this interface element as well as their location thereon are identified in the right part.

In this way there are counted nine information zones marked by the numbers 1 to 9 in the right part of FIG. 5, and which will be designated hereinafter by the references Z1 to Z9.

After the zones of each interface element have been identified, the roles and responsibilities (functions of different zones, taking into account tasks and sub-tasks that relate to control of the aircraft and wherein each interface element is used) are determined in the course of the following step E14. On the basis of this determination of the roles and responsibilities of zones, it will be possible to determine the agents of the multi-agent cognitive model.

Thus, for example, for the PFD interface element, there are distinguished three fundamental tasks, which are control of the airplane (T1), navigation (T2) and protection to keep the airplane flying (T3).

Within each of these three tasks, it is possible to determine more precise sub-tasks:
  indicating values of parameters of the airplane (T11),
  indicating selected values or points (originating from the FMGS: "Flight Management and Guidance System" in English) (T12),
  indicating the flight tendencies (T13),
  giving the indications of radionavigation instruments and of the FMGS (T21),
  permitting the indications furnished by the FMGS to be followed easily (T22),
  presenting the flying limits (T31), and
  alerting (T32).

As soon as these tasks and sub-tasks have been determined, the role and responsibilities of the different zones of each interface element and, for example, of the PFD are determined.

Figure 6:
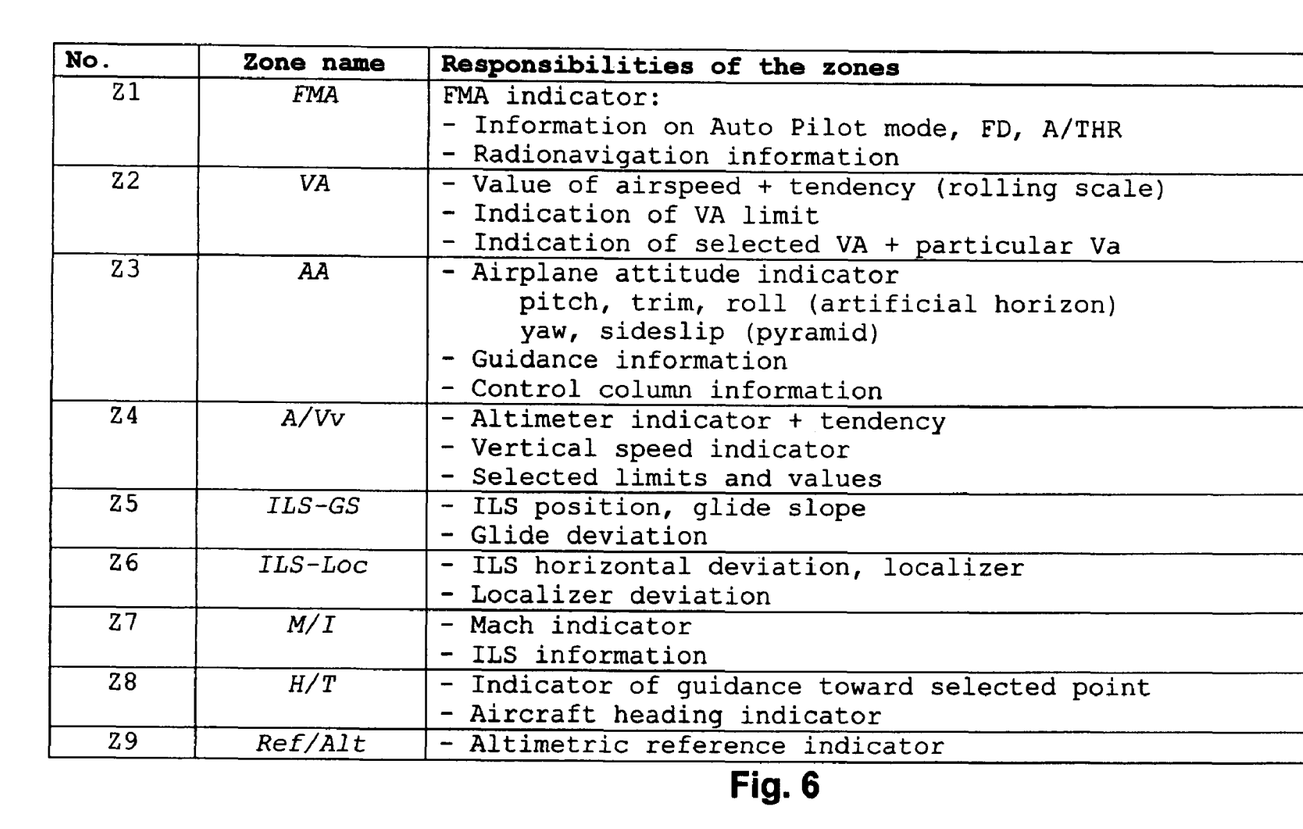
FIG. 6 schematically illustrates the functions assigned to the zones defined in FIG. 5.

In FIG. 6 there are identified and represented, in a table, different functions or responsibilities of previously identified zones.

Thus, on the basis of zone Z1 designated as "FMA" ("Flight Mode Annunciator" in English), it is possible to identify four sub-zones that furnish information on the control mode (for example, automatic pilot mode) and on radionavigation.

Zone Z2 designated as "VA", furnishes information on the airspeed and can be divided into two sub-zones.

Zone Z3 designated as "AA" and which can be divided into two sub-zones, furnishes information on the attitude of the airplane (pitch, trim, roll, guidance, control column, etc.).

Zone Z4 designated as "A/Vv" and which can be divided into three sub-zones, serves as altimeter and furnishes information on the vertical speed of the airplane.

Zone Z5 designated as "ILS-GS" (ILS for "Instrument Landing System" and GS for "Glide Slope" in English) furnishes information on the vertical position of the instrument landing system ILS relative to the slope GS.

Zone Z6 designated as "ILS-Loc", furnishes information on the ILS horizontal position relative to the, in English, "localizer".

Zone Z7 designated as "M/I", furnishes information on the Mach number of the airplane as well as navigation information.

Zone Z8 designated as "H/T" ("heading/track zone" in English), furnishes information on the guidance and heading of the aircraft.

Finally, zone Z9 designated as "Ref/Alt", furnishes information on the altimetric reference.

It will be noted that the names of the zones are derived from the definition of the agent's role, which will be defined later.

By virtue of the table of FIG. 6 and of the determination of tasks and sub-tasks, it is possible in the course of the following step E16 to determine the cognitive agents used to build the cognitive model according to the criteria related to control and navigation.

Returning to the example of modeling of the PFD interface element, there are determined the cognitive agents that make it possible to describe the cognitive processes of use of different zones of the PFD interface element as represented in FIG. 7.

Thus there are determined agents related to the analysis of the vertical motion (altitude, V/S), to the analysis of the horizontal motion (speed and heading), to the analysis of attitude A/C, to the tracking of FMGS instructions, to the orientation/ILS, to the FMA, to the color code and to the alert.

As indicated in the "agent responsibilities" column, for example, agent A1 has the role of analyzing the vertical motion of the airplane by focusing on the parameters of altitude and vertical speed and to perform this role, it is responsible for the values of the vertical parameters and for the symbols of these parameters.

To perform this role, agent A1 relies on four cognitive resources related to the responsibility of the values of the vertical parameters on the one hand and on two cognitive resources related to the responsibility of the symbology on the other hand. This permits the agent to achieve the tasks that are related mainly to control of the apparatus (T11 and T12) and that are localized in zone Z4 of the PFD interface element.

In the course of the following step E18, the system inputs and outputs are identified relative to the use context, in other words, information proposed by the system (interface elements such as the PFD) is identified at a given instant relative to a given use situation, such as takeoff or climb.

In the course of the following step E20 of the algorithm, it is provided that system information (such as interface element PFD) situated at the processing level will be identified.

Figure 8:
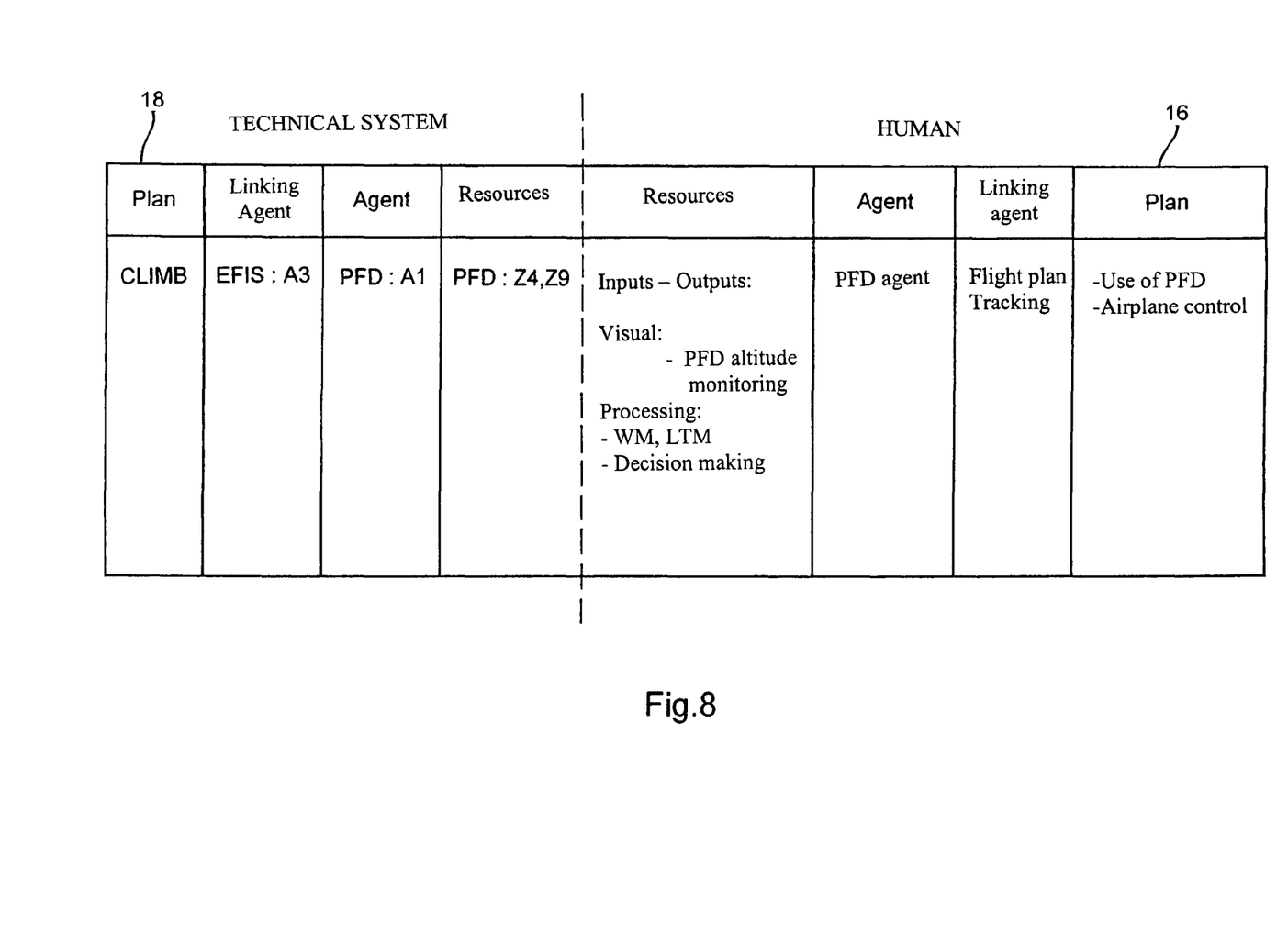

FIG. 8 illustrates in detail the construction of tables 16 and 18 of FIG. 2 according to the structure comprising plan, linking agent, agent and resources, both for the technical system side and the human side, during altitude monitoring relative to instrument PFD.

Thus, on the technical system side (Table 18), it is determined, within the framework of a plan relating to the "climb" procedure illustrated in FIG. 4, that the resources employed are zones Z4 and Z9 of the PFD (FIG. 7), the agent is agent A1 of the PFD and the linking agent is agent A3 of the on-board board instruments known in English as "Electronic Flight Instrument System" (EFIS).

Table 16 (human side) will be described later.

In parallel with the description that has just been given in the course of steps E10 to E20, there is established an interaction model of the human side with reference to steps E22 to E28, which will now be described.

Information of human origin is furnished, for example, by means of interviews with experts in control or in flight procedure. In the course of these interviews describing given situations (in other words, use of instruments, such as ND and PFD, that present two-dimensional information, compared with the use of an instrument that would present the same information directly in three dimensions), the experts are asked to indicate the actions that they would envision taking, the checks to be performed, the information that they would need in order to act, etc.

In the course of a first step E22, it is provided that there will be identified, at the input-output level of the interface model on the human side, modes of interaction with the technical system, meaning, for example, the input-output channels constituting human vision, human language, audition, kinesthesia, etc.

In the course of this same step, there are also identified the necessary resources for undertaking the appropriate maneuver, or in other words, for example, for perceiving (gazing at) the altitude information furnished by the corresponding zone of interface element PFD, hearing (listening to) the auditory "TERRAIN" alarm ("call-out" in English) (meaning that the airplane is outside the safety zone relative to the terrain, or in other words is too low), pulling back on the control column or else opening the throttle once again.

It is appropriate to note that it is also optionally possible to remain confined to the input-output level in restricted use situations such as takeoff, for example. Such situations are distinct from flight phases and therefore from specific procedures or subsections of procedure. It is possible to examine these specific phases in depth by studying how they proceed under difficult conditions—bad weather, engine failures, defects in the presentation of information, user stress or fatigue.

In the course of the following step E24, it is provided that the multi-modal interactions at the input-output level of the human cognitive model, or in other words the interactions between the different channels (vision, audition, etc.) will be identified.

Thus, for example, there are identified the interactions between the different previously identified modes on the basis of cases surveyed during interviews, such as that consisting in perceiving altitude information on the interface element in question and hearing the auditory alarm and thus pulling back on the control column.

In the course of the following step E26, it is provided that the processing level of the cognitive model on the human side will be defined.

This is achieved by providing on the one hand that those actions to be taken by the pilot and/or those decisions to be made that have proved particularly difficult or delicate to implement will be identified in relation to how they are modeled by the technical system side, and on the other hand that hypotheses on the processing applied to these sensitive or difficult parts will be established.

Thus, for example, it is supposed that the user will make the right decision relative to the visual and auditory information that the interface elements of the technical system furnish to him in the collision alert case.

In the course of this same step E26, there is identified the processing of information according to the different previously identified modes (input-output channels).

Table 16 representative of the modeling of the human side corresponding to table 18 of the technical system side is constructed, within the framework of monitoring of the airplane's altitude relative to the PFD instrument, on the basis of the defined plan, or in other words the use of the PFD and the control of the airplane.

In this table the resources used at the input-output and processing levels are determined/identified.

Thus there are identified the visual inputs and outputs, or in other words the altitude monitoring furnished by the PFD and the corresponding processing, or in other words work memory (WM) and long term memory (LTM) as well as decision making.

The corresponding agent is the "PFD" and the aforesaid resources are linked to the "flight plan tracking" agent.

In this way the multi-agent pilot-cockpit cognitive model is constructed symmetrically.

The following step E28 makes it possible to supplement the human cognitive model and to validate it with an expert in the discipline (specialist in cognitive psychology, in physiology, in language).

In the course of the following step E30, it is provided that the model representative of the human-technical system (pilot-cockpit) pair will be validated with experts of the different disciplines involved, or in other words experts in flight procedure, pilot experts, designers and experts in human factors (experts in vision, audition, language, kinesthesia, etc.).

It will be noted that steps E28 and E30 may optionally be combined.

Once the model has been constructed, there is initiated the previously described step E2, in the course of which the methods of human factor analysis are used in order to collect data reflecting corresponding human activities by means of an experimental protocol.

For this purpose it is possible to employ several analysis methods, as indicated hereinabove, wherein visual data representative of the pilot's eye movements in the course of time over one or more of the interface elements of the cockpit are acquired by means of an oculometric apparatus (more particularly, the position of the pilot's gaze is tracked from one zone of one interface element to another zone of another interface element), video data representative of the movements of the pilot as he acts, for example, on the control column, are acquired by means of the video system of the cockpit, and/or auditory data are acquired by means of an audio recording apparatus.

By virtue of the framework or model defined in the course of the preceding steps, it is possible to link, for example, the two types of human activity data (oculometric data and data relating to the motor function of the human body), inasmuch as a common receptacle (database) has been positioned to receive the two types of information of technical origin and human origin.

It will be noted that the experimental protocols comprising the basis of the different human factor evaluations are derived from the previously constructed interaction model, and they also supply this model by the results that they produce.

Furthermore, it will be noted that the use of a common receptacle capable of cross-referencing methods and evaluations ensures coherence, homogeneity and traceability of the collected data.

More particularly, oculometric apparatus 38 of FIG. 1b makes it possible to record the position of the pilot's gaze at a visual scene, thus making it possible to track the different visual elements traversed by the pilot's gaze at the interface elements of the cockpit as well as at the external visual scene.

The oculometric apparatus includes an analog device, or in other words the oculometer, which records the movements of the pilot's eye. The oculometer includes three components, specifically a camera recording the eye movements, an infrared source emitting an infrared beam into the eye, and a camera recording the visual scene viewed by the pilot.

Thus the video data acquired by the camera recording the eye movements and the video data acquired by the camera recording the visual scene viewed by the pilot are superposed and the position of the pilot's gaze is represented by a pointer (such as a circle or a crosshair), which moves over the visual scene.

The use of the oculometer alone, although sufficient for the external visual scene, does not provide sufficient precision if it is desired to record particularly fine details of the pilot's eye movement, for example reading of texts or gathering of information on specific zones of screens.

A magnetic field generator is therefore associated with the oculometer in order to impart maximum precision.

The magnetic field generator is used as a frame of reference in three-dimensional space to sense the position of the pilot's head relative to the coordinates of the different surfaces and planes that make up his real environment. In this regard, the surfaces and planes in question are those corresponding to the screens and to the control panels of the cockpit comprising regions of interest, which themselves can be broken down into zones and sub-zones of interest, as was seen hereinabove, for each interface element.

To analyze the head movements of the pilot, there are therefore used a magnetic field generator and a receiver fixed to the pilot's head and these components, in combination with the aforesaid analog device (oculometer), make it possible to obtain maximum precision of the position of the user's gaze at a visual scene.

More particularly, the receiver fixed to the pilot's head furnishes the exact position of the head in the three-dimensional model.

The distance between this head receiver and the camera recording the scene, as well as the distance between the head receiver and the eyes of the pilot, is then introduced into the three-dimensional model. The first of the aforesaid distances is necessary to achieve calibration of the camera relative to the scene, and the second of these distances is necessary to calibrate the analog device (oculometer).

It will be noted that the adaptation of the aforesaid oculometric apparatus to the cockpit, in order to impart maximum precision by combination of data furnished by the position of the pilot's head and data furnished by the position of his gaze, takes into account the geometric study of the cockpit and the study of the posture of the pilot.

While performing the geometric study of the cockpit, the Applicant noticed that, for installing the magnetic field generator on a support in the cockpit, it was advisable to ensure that the distance between the generator and any metal surface was sufficiently large to minimize the magnetic interferences that can be produced with the oculometric apparatus.

In addition, while configuring different components comprising the oculometric apparatus inside the cockpit, the Applicant found that the distance between the magnetic field generator and the receiver for the position of the pilot's head had to be strictly shorter than the distance between the receiver for the position of the pilot's head and any metal surface, again to reduce the magnetic interferences as much as possible.

It is appropriate to note that the postural study of the pilot makes it possible to define the limits of his volume of movement and therefore the distances between the head receiver and the magnetic field source.

By virtue of the aforesaid oculometric apparatus, it is possible to record very precisely the ocular movements (behaviors), such as the fixations, saccades and pursuits that characterize the way in which the pilot gazes at the specific elements of an aeronautical visual scene (on-board instruments and exterior visual scene). The constituent components of an oculometric apparatus, or in other words the analog device, the magnetic field generator and a helmet supporting the head receiver, can be obtained from Senso-Motric Instruments GmbH, Warthestrasse 21, D-14513 Teltow, Germany.

As already indicated hereinabove, in the course of step E3 following the data acquisition step, such data are analyzed with the test subject or subjects (pilots) in order to verify the coherence and reliability of the test results.

Thus, according to an example borrowed from the automobile industry (since the invention can in fact be applied to disciplines other than aeronautics), by using an oculometer in a teaching motor vehicle, the instructor and the student, by viewing the video data recorded with the oculometer once the lesson has ended, can better understand why the student did not look in the rear-view mirror before turning.

After all of the data collected in the course of step E2 have been analyzed and interpreted in the course of step E3, they are then validated at a first intradisciplinary collective level with the experts of the discipline in question (for example, a population of pilots in the case of aeronautics), and are then validated at an interdisciplinary collective level with the experts of different disciplines (human factor experts, engineers, pilots), in order that these data will be shared with all interested parties.

Thus the test data are explained and shared at three levels, an individual level, an intradisciplinary level and an interdisciplinary level.

This validation with the experts makes it possible to return to the definition of the framework determined during the first steps (construction of the multi-agent cognitive model) and to adjust and refine the model as a function of the test results and of the interpretation thereof by the experts.

As soon as the model is validated, it is possible to deduce therefrom potential improvements to the pilot-cockpit interface elements and to the procedures for using these interface elements (such as flight procedure, etc.), or to use this model to teach the pilots to train themselves in the interface elements of the cockpit.

By way of example, the method according to the invention makes it possible to determine at which instant a display system mounted high up above the pilot's head ("head up display" in English) should be used to optimize the use thereof. The method according to the invention also makes it possible to determine whether such a display system is actually being used by the operator in a particular type of vehicle.

In another example, the method according to the invention makes it possible to check that the pilot is mentally constructing a three-dimensional visual representation of the position of his vehicle in space, and is doing so solely on the basis of two-dimensional information furnished by on-board instruments.

The method according to the invention can then be used as the basis for designing a new instrument that furnishes a three-dimensional visual representation of the position of the vehicle in space.

The method is particularly advantageous for determining which information furnished by interface elements of the on-board panel is actually useful.

In fact, by virtue in particular of the acquisition and analysis of data, for example oculometric data, the method makes it possible to separate information indispensable to the user from information that is not particularly useful or is even redundant.

The invention claimed is:

1. A method for determining a model for an arrangement of on-board instruments in a vehicle, the method comprising:
    constructing, with a processor, the model of the arrangement of the on-board instruments within an instrument panel based on a first type of information representative of the on-board instruments of the vehicle, and a second type of information representative of the knowledge that the user has concerning the use of the on-board instruments of the vehicle;
    acquiring data representative of at least one human activity which occurs during the interaction between the user and the on-board instruments, the acquiring of the representative data is achieved by at least one data-acquisition apparatus;
    analyzing, with a processor, the data that is acquired; and
    adjusting the model for the arrangement of the on-board instruments within the instrument panel as a function of the data that was analyzed so as to obtain an adjusted model that is different from the previously constructed model,
    wherein the configuration of information of the first type according to a multi-agent cognitive model includes the following steps for each on-board instrument:
    determining tasks relating to the use of the vehicle and performed by the on-board instrument under consideration,
    determining agents of the multi-agent cognitive model relative to the determined tasks, and
    establishing a link between the determined agents of the cognitive model and identified functional zones of the on-board instrument under consideration.

2. A method according to claim 1, wherein the first type of information is of technical origin and the second type of information is of human origin, and are furnished with an identical configuration to a dynamic database having a symmetric user-technical system structure.

3. A method according to claim 1, wherein the first and second type of information are configured according to a multi-agent cognitive model.

4. A method according to claim 3, wherein the configuration of information of the first type according to a multi-agent cognitive model includes establishing a link between procedures for use of the vehicle and the on-board instruments of the vehicle.

5. A method according to claim 3, wherein the configuration of information of the first type according to a multi-agent cognitive model includes identifying functional zones on each on-board instrument under consideration.

6. A method according to claim 1, wherein the at least one human activity which occurs during the interaction between the user and the on-board instruments is selected among vision, speech, audition, motor function, and physiological manifestations and reactions of the human body.

7. A method according to claim 1, wherein the data-acquisition apparatus is an oculometric apparatus recording visual data representative of the eye movements of the user over the on-board instruments.

8. A method according to claim 1, wherein the on-board instruments are aircraft instruments in an airplane cockpit.

9. A method according to claim 1, wherein the on-board instruments are motor vehicle instruments in a dash panel of a motor vehicle.

10. The method according to claim 1, wherein the model evaluates one or more new on-board instruments.

11. The method according to claim 1, wherein the model is used to modify a procedure for use of the vehicle.

12. The method according to claim 1, wherein the model is used to train a pilot.

13. The method according to claim 1, wherein the adjusted model is obtained by moving a position of an on-board instrument relative to other on-board instruments.

14. The method according to claim 1, wherein the adjusted model has an improved positional arrangement of the plurality of interface elements relative to another compared to the previously constructed model.

15. A method according to claim 1, further comprising:
    acquiring data including information on interactions between a user and zones of different on-board instruments.

16. A method according to claim 1, wherein the acquiring of the data is performed by tracking a user's eye movement from one zone of on-board instruments to another zone of different on-board instruments.

17. A system which determines a model for an arrangement of on-board instruments in a vehicle, comprising:
    a processor;
    a construction unit which constructs the model of the arrangement of the on-board instruments within an instrument panel based on a first type of information representative of the on-board instruments of the vehicle, and a second type of information representative of the knowledge that a user has concerning the use of the on-board instruments;
    at least one data acquisition unit which acquires data representative of at least one human activity which occurs during the interaction between the user and the on-board instruments;
    an analyzer which analyzes the data thus acquired; and
    an adjustment unit which adjusts the model for the arrangement of the on-board instruments within the instrument panel as a function of the data analysis so as to obtain an adjusted model that is different from the previously constructed model,
    a configuration unit which configures information of the first type according to a multi-agent cognitive model performs for each on-board instrument:

determining tasks relating to the use of the vehicle and performed by the on-board instrument under consideration, determining agents of the multi-agent cognitive model relative to the determined tasks, and establishing a link between the determined agents of the cognitive model and identified functional zones of the on-board instrument under consideration.

18. The system according to claim 17, wherein the adjusted model is obtained by moving a position of an on-board instrument relative to other on-board instruments.

19. The system according to claim 17, wherein the adjusted model has an improved positional arrangement of the plurality of interface elements relative to another compared to the previously constructed model.

* * * * *